United States Patent [19]

Hoege et al.

[11] Patent Number: 5,732,388
[45] Date of Patent: Mar. 24, 1998

[54] FEATURE EXTRACTION METHOD FOR A SPEECH SIGNAL

[75] Inventors: Harald Hoege, Gauting; Alfred Hauenstein, Munich; Erwin Marschall, Garmisch-Partenkirchen, all of Germany

[73] Assignee: Siemens Aktiengesellschaft, Munich, Germany

[21] Appl. No.: 584,816

[22] Filed: Jan. 11, 1996

[30] Foreign Application Priority Data

Jan. 10, 1995 [DE] Germany ............... 195 00 494.9

[51] Int. Cl.$^6$ ................................... G01L 3/02
[52] U.S. Cl. .................. 704/205; 704/201; 704/226
[58] Field of Search ..................... 395/2.1, 2.12, 395/2.14, 2.15, 2.3, 2.35–2.37, 2.39, 2.4, 2.42, 2.45, 2.6, 2.65

[56] References Cited

U.S. PATENT DOCUMENTS

| | | | |
|---|---|---|---|
| 4,032,710 | 6/1977 | Martin et al. | 395/2.62 |
| 4,720,802 | 1/1988 | Damoulakis et al. | 395/2.53 |
| 4,866,777 | 9/1989 | Mulla et al. | 395/2.15 |

FOREIGN PATENT DOCUMENTS

OS 41 11 995  10/1992  Germany.

OTHER PUBLICATIONS

"Speaker Independent Continuous HMM–Based Recognition of Isolated Words On a Real–Time Multi–DSP System," Aktas et al. Proc. Eurospeech 91, 1991, pp. 1345–1348.

"Online Channel Compensation For Robust Speech Recognition," Wittmann et al., Proc. Eurospeech 1993, pp. 1251–1254.

"Optimal Estimators For Spectral Restoration of Noisy Speech," Porter et al., CASSP '84, San Diego, California 1984, pp. 18A.21–18A.2.4.

"Towards Handling The Acoustic Environment in Spoken Language Processing," Hermansky et al. Proc. ICSLP 92, pp. 85–88.

"Noise Reduction for Speech Communication Systems," Kroschel, Frequenz, vol. 42 (1988), No. 2/3, pp. 79–84.

"A Spectral Subtraction Algorithm for Suppression of Acoustic Noise in Speech," Boll, Proc. IEEE–ICASSP, 1979, pp. 200–203.

*Primary Examiner*—Kee M. Tung
*Attorney, Agent, or Firm*—Hill, Steadman & Simpson

[57] ABSTRACT

The invention expands a feature extraction unit of a type known in the art with an adaptive channel compensation. The filter coefficients for a high-pass filter for eliminating the chronologically sliding average are set time-dependently with the adaptive channel compensation. As a result, a faster channel adaptation, and a better error compensation in the speech feature extraction are achieved, leading to a more reliable speech recognition. The parameters for the individual function blocks of the feature extraction unit are determined and stored in advance for specific speech transmission channels such as in mobile radio telephone, ISDN and analog speech transmission. The speech recognition with the assistance of the feature extraction unit can subsequently then ensue in channel-associated fashion with the stored parameters values.

9 Claims, 2 Drawing Sheets

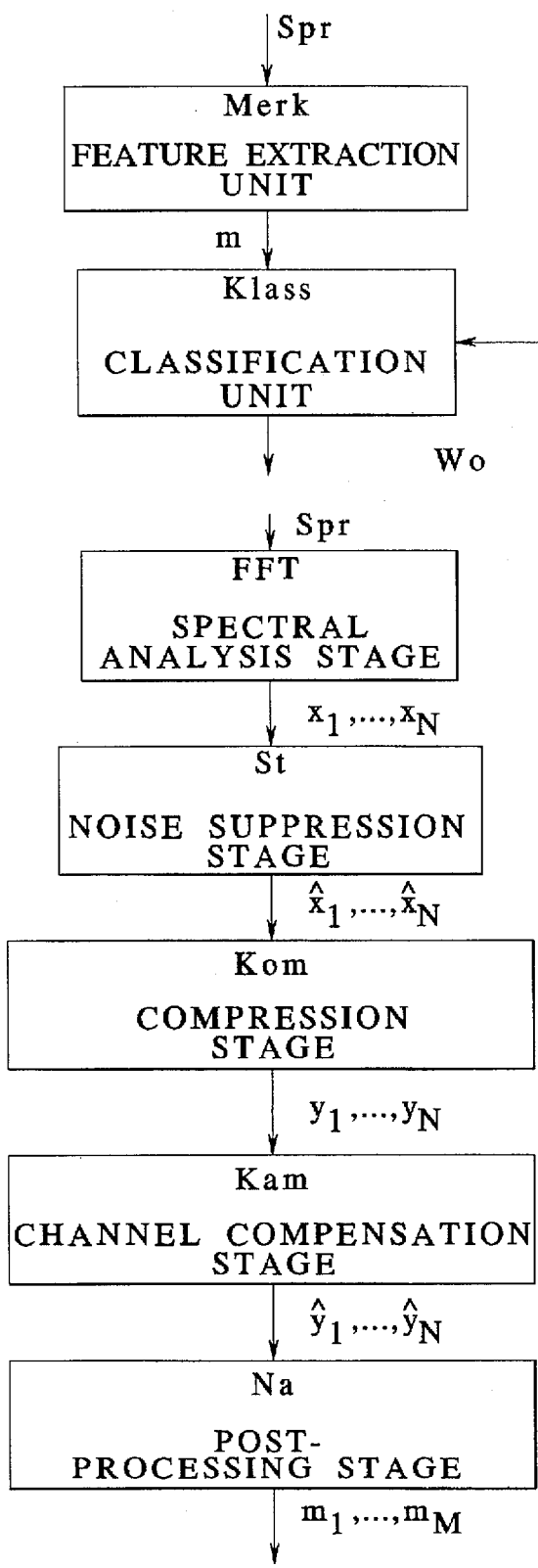
*FIG. 1* PRIOR ART
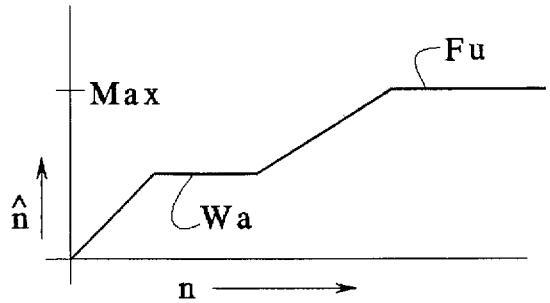
*FIG. 4*
*FIG. 2* PRIOR ART

FEATURE EXTRACTION METHOD FOR A SPEECH SIGNAL

BACKGROUND OF THE INVENTION

1. Field of the Invention

The present invention is directed to a method for extracting features from a voice or speech signal transmitted via a communication connection.

2. Description of the Prior Art

Recognition in most speech recognition systems is implemented in two stages. In the first stage, the feature extraction stage, features that are based on a short-term spectral analysis are determined from the speech signal at predetermined time intervals. In the second stage, these spectral features are compared to patterns of spectral features of the words to be recognized. The so-called Hidden Markov Model (HMM) has proven especially suitable as such a pattern. In the comparison, a word or words is/are deemed recognized to which the pattern has the most similarity (least distance, highest probability) to the spectral features of the speech signal in question (classification stage). The Viterbi algorithm has become established as a comparison method.

A significant problem in speech recognition is the variability of the features that can be imposed on sounds produced by anatomy of the vocal tract, such as by speakers, acoustic channels (for example, telephone channel, mobile radio telephone, room acoustics and microphone), as well as by additive disturbances (for example, automobile noises, crosstalk, quantization noise of coders). In order to achieve a high recognition performance of a system, all possible variabilities in the patterns must be represented, so that a high similarity between the spectral features and the patterns for the word to be recognized is achieved. Due to the high variability of the patterns, such a comprehensive representation is practically impossible and the recognition performance decreases to a greater or lesser extent dependent on the source of the variability.

There are various proposed solutions for these problems.

The RASTA method (H. Hermansky, N. Morgan: "Towards Handling the Acoustic Environment in Spoken Language Processing", Proc. ICSLP92, pp. Tu.fPM.1.1) has proven an effective method for reducing the variabilities of the features with respect to the transmission properties of various channels and the method of spectral subtraction (S. F. Boll: "A Spectral Subtraction Algorithm for Suppression of Acoustic Noise in Speech", Proc. IEEE-ICASSP, 1979, pp. 200–203) has proven an effective method for reducing the variabilities of the features with respect to additive disturbances. Both methods are already integrated into a feature extraction unit.

SUMMARY OF THE INVENTION

An object of the present invention is to provide a method for the feature extraction of a speech signal that enables a fast adaptation to and compensation of transmission channel-associated errors.

The above object is achieved in accordance with the principles of the present invention in a method for extracting features from a speech signal wherein spectral energies of the speech signal in question are determined by conducting a brief-duration spectral analysis, such as FFT. Logarithmized spectral energies are then obtained from these spectral energies of the speech signal. Channel-compensated spectral energies are then formed by subtracting a sliding average of the logarithmized spectral energies from the individual logarithmized spectral energies using a high-pass filter with time-dependent filter coefficients.

The chronologically sliding averages of the logarithmized spectral energies can be eliminated in an especially advantageous way using a high-pass filter whose filter coefficients are defined in time-dependent fashion. Above all else, the speech recognition is improved in that an adaptation of the feature extraction to different transmission channels ensues very fast.

The base parameters for defining the filter coefficients are extracted in an especially advantageous way for the inventive method with statistical methods from speech signals from the language transmitted as the signal to be recognized. Speaker and transmission channel characteristics are thus especially advantageously incorporated into the speech recognition method.

Another advantage of the inventive method is that disturbances that lie below a predetermined noise level are suppressed. This leads to a feature extraction that is more resistant to disturbances since only the noise level is taken into consideration below a specific signal level with reference to the respective spectral energies.

The control parameters of the individual feature extraction steps can be determined in advance for specific, known voice transmission channels and can be stored with the inventive method. The feature extraction in the speech recognition then requires an unambiguous identification of the individual speech transmission channels and, when speech arrives on such a channel, the stored parameters are loaded and the speech recognition is implemented with parameters specifically adapted to the channel.

Advantageously, this parameter extraction can be undertaken, for example, for ISDN speech lines, mobile radio telephone lines or analog telephones.

DESCRIPTION OF THE DRAWINGS

FIG. 1 is a block diagram of an exemplary known speech recognition system.

FIG. 2 is a block diagram of an example of known feature extraction in a speech recognition system.

FIG. 4 shows an example of a time-weighting function for use in the present invention.

DESCRIPTION OF THE PREFERRED EMBODIMENTS

Figure 3:
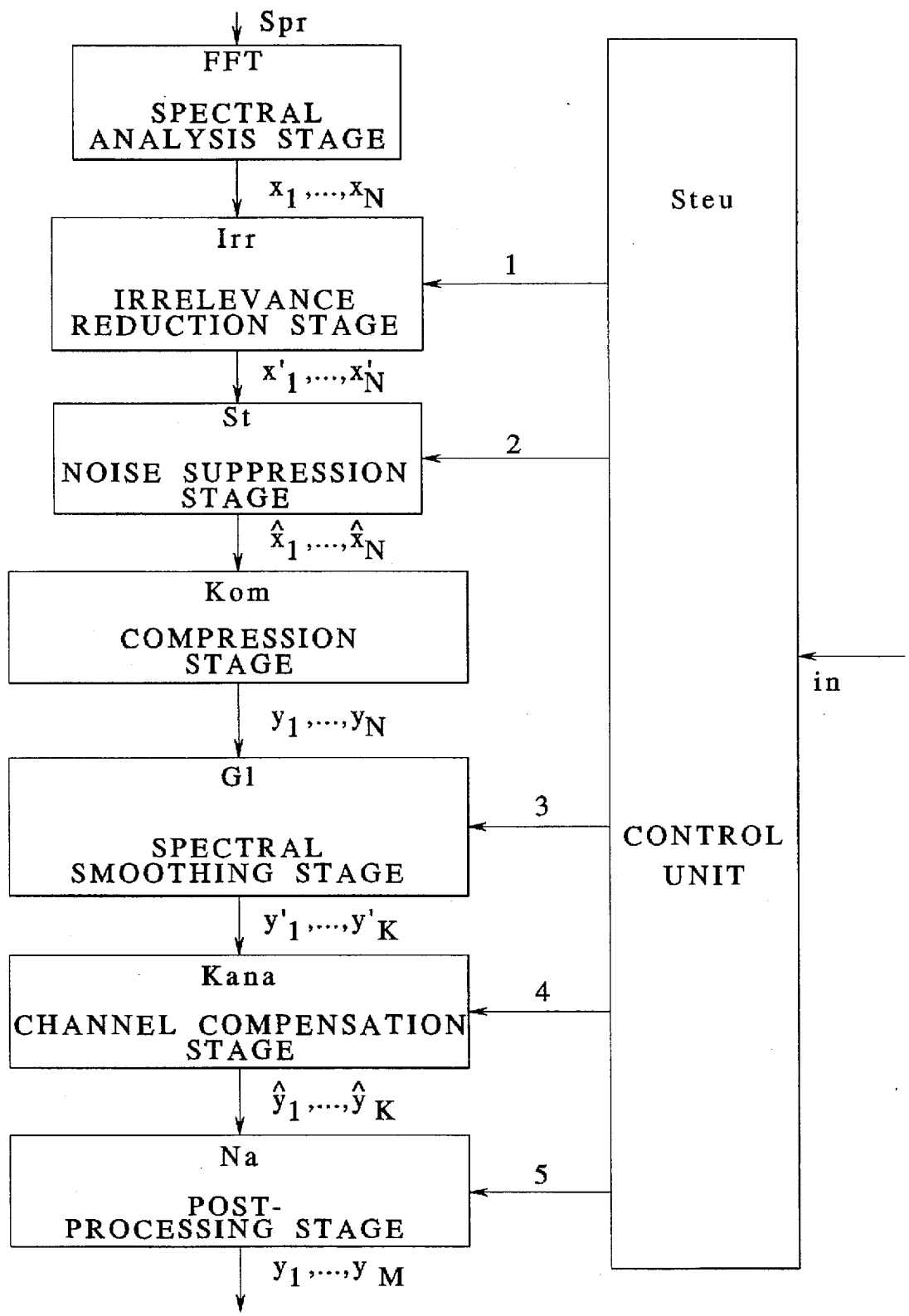
FIG. 3 is a block diagram of an example of an inventive feature extraction unit.

FIG. 1 shows an example of a conventional voice or speech recognition system. The speech signal Spr first proceeds into a feature extraction unit Merk in which the spectral features (referenced m) of the speech signal Spr are usually analyzed. The spectral features m subsequently proceed into a classification unit Klass in which they are compared to the patterns supplied from a patterns source HMM, usually hidden Markov Models, the results of the comparison being an output from the speech recognition system in the form of words Wo.

FIG. 2 shows an example of a known feature extraction unit for speech recognition. The speech signal Spr first proceeds into a spectral analysis stage FFT in which a brief-duration spectral analysis is implemented, resulting in an output of spectral energies $x_1, \ldots, x_N$. In a noise suppression stage St, noise suppression is subsequently implemented with these spectral energies, this usually being a spectral subtraction of the noise signal. Noise-free spectral energies $\hat{x}_1, \ldots, \hat{x}_N$ thus arise. The noise-free signals are subsequently compressed in a compression stage Kom, usually by a logarithmization of the values. Logarithmized spectral energies $y_1, \ldots, y_N$ are obtained. For further feature extraction, channel compensation of the logarithmized spectral energies takes place in a channel compensation stage Kan. Channel-compensated spectral energies $\hat{y}_1, \ldots, \hat{y}_N$ are thus obtained. The RASTA method is usually utilized for the channel compensation of the spectral energies. Post-processing of the channel-compensated spectral energies subsequently occurs in a post-processing stage Na and the speech features $m_1, \ldots, m_M$ are obtained.

As FIG. 2 shows in detail, the speech signal is subjected by sections (preferably in sections of 10–30 ms) to a brief-duration spectral analysis, which is usually implemented by a Fourier transformation (FFT). The number of spectral energies varies dependent on the spectral resolution of the FFT. In telephone applications given a bandwidth of the telephone channel of 3.4 KHz, a resolution of N=256 spectral energies has proven beneficial and a resolution of N=512 spectral energies has proven beneficial in office applications (bandwidth 7.4 Khz).

After the spectral analysis, spectral substraction can be utilized for noise suppression, whereby the estimated spectra $\hat{x}_{si}$ of the noise signal are subtracted from the spectral energies $x_i$ (i=1, ..., N):

$$\hat{x}_i = x_i - \hat{x}_{si}\ i=1, \ldots, N$$

The estimate of the noise spectra preferably ensues during a pause in speaking while the signal Spr is composed only of the noise signal.

For channel compensation, the noise-free spectral energies $\hat{x}_i$ are preferably compressed in terms of their dynamics. The following logarithm is often employed as compression characteristic:

$$y_i = \log \hat{x}_i\ i=1, \ldots, N$$

As an example, the RASTA method is applied here to the compressed spectral energies. The basic idea is to remove the channel-dependent average $\hat{y}_i$ (i=1, ..., N) from the $y_i$ (i=1,N). This ensues, for example, with a high-pass filter having the transfer function:

$$H(z) = \frac{z^{-4}(0.2 + 0.1z - 0.1z^3 - 0.2z^4)}{(1 - 0.94z^{-1})} \quad (1)$$

A specific high-pass filter forms the subtrahend of the sliding average $\bar{y}_i$ from the spectral values $y_i$ (M. Wittmann, O. Schmidbauer, A. Aktas: "Online Channel Compensation for Robust Speech Recognition", Proc. Eurospeech 1993, pp. 1251–1254).

If the determination of the sliding average $\bar{y}_i$ for each speech section n (n=1, 2, ...) ensues recursively according to the relationship $$\bar{y}_i(n) = a\bar{y}_{i-1})(N-1) + (1-a)\bar{y}_i(n)\ i=1, \ldots, N$$

then it can be shown that the elimination of the average of $y_i$ with $$\hat{y}_i(n) = y_i(n) - \bar{y}_i(n)\ i=1, \ldots, N$$

is equivalent to high-pass filtering with the transfer function $$H(z) = \frac{a(1 - z^{-1})}{(1 - az^{-1})}$$

whereby H(z) represents a simplified version of equation (1).

In order to be able to take the speaker properties into consideration better in the average $\bar{y}_i$ there is the possibility of employing only those speech signals Spr for the determination of $\bar{y}_i$ wherein no pause in speaking is present (Wittmann et al., supra).

Finally, the channel-compensated spectral energies are subjected to post-processing, whereby the number of spectral energies $y_i$ (i=1, ... N) is reduced to few features $m_{i_1}, \ldots m_M$ (for example, M=50 values) by a linear operation.

FIG. 3 indicates an example of a feature extraction unit of a speech recognition system according to the inventive method. The function blocks which are identically referenced to those of FIG. 2 respectively implement the same operations as the function blocks in FIG. 2. The indexing and the referencing are equivalent to that employed in FIG. 2.

In addition to the feature extraction unit of FIG. 2, an irrelevance reduction stage Irr is used on a case-by-case basis in an embodiment of the inventive method. The irrelevance reduction, for example, is implemented immediately following the spectral brief-duration analysis. The spectral energies obtained from the brief-duration analysis FFT are thereby compared to spectral energies that were calculated from the characteristic noise signal. When the spectral energies are lower than those of the noise signal of the respective frequency range, the noise spectral energy is allocated to the respective frequency range and the method is further-implemented with those spectral energies.

The irrelevance-reduced spectral energies $x_1', \ldots, x_N'$ are obtained after the irrelevancy reduction Irr. In addition to the feature extraction method described in FIG. 2, spectral smoothing takes place in a spectral smoothing stage G1 preferably applied to the compressed spectral energies $y_1, \ldots y_N$. This spectral smoothing G1 is known in the art and is not of essential significance for the functioning of the inventive method. On the contrary, the calculating outlay for the following method steps is reduced by the spectral smoothing. Smoothed spectral energies $y_1, \ldots y_K$ are thus obtained. A further step of the inventive method provides a channel-adaptive compensation of the smoothed spectral energies.

The filter coefficients for this compensation are determined time-dependent according to the inventive method.

The invention is thereby based on three separate formulations whose object is to reduce the variability of the features further. These formulations are methods that can be efficiently realized. The methods, for example, are integrated into the feature extraction unit and can be technologically embodied, for example, in an arrangement as disclosed by A. Aktas, K. Zünkler: "Speaker Independent Continuous HMM-Based Recognition of Isolated Words on a Real-Time Multi-DSP-System", Proc. Eurospeech 91, 1991, pp. 1345–1348. An example of an inventive feature extraction unit is shown in FIG. 3.

After the brief-duration spectral analysis FFT, an irrelevancy reduction Irris preferably implemented, the object thereof being to remove those portions known to be irrelevant based on the application from the speech recognition. Such portions are, for example:

Quantization noise of the coders (for example, A/D-D/A converters for digitization of analog signals, coders for mobile transmission such as GSM)

Disturbing noises outside the useful channel (for example, signals below 300 Hz and above 3.4 KHz in a telephone channel)

Constant workplace (background) noises.

The irrelevancy reduction is realized by the method $$x'_i = \begin{bmatrix} x_i \text{ if } x_i > e_i \\ e_i \text{ if } x_i \leq e_i \end{bmatrix} \quad 1, \ldots, N$$

whereby the thresholds $e_i$ represent spectral-specific constants. The thresholds can be empirically determined, whereby the thresholds are set higher as the irrelevant part of the spectral energy is larger. By adapting the thresholds $e_i$ to the speech coders that are utilized in ISDN transmission channels, a reduction of the error rate was experimentally achieved in the speech recognition.

After the compression, for example, a spectral smoothing of the compressed spectral energies is first implemented, as also disclosed by A. Aktas, K. Zünkler: "Speaker Independent Continuous HMM-Based Recognition of Isolated Words on a Real-Time Multi-DSP-System", Proc. Eurospeech 91, 1991, pp. 1345–1348.

This operation is achieved by a matrix operation:

$$y'_i = \sum_{k=1}^{N} a_{ik} y_k; \, i = 1, \ldots, K$$

As already previously mentioned, the values N=256 (number of spectral energies) and K=24 (number of smoothed spectral energies) have proven beneficial for telephone applications but can be replaced by other values. The spectral smoothing can also be implemented with compressed spectral energies that were produced from a plurality of signal sections n, n–1, . . . :

$$y'(n)_i = \sum_{k=1}^{N} a_{ik}(0) y_k(n) + \sum_{k=1}^{N} a_{ik}(1) y_k(n-1) + \ldots;$$

The advantage achieved by the spectral smoothing is that the channel compensation has to be implemented for fewer spectra, and also these spectra no longer contain the disturbing fundamental frequency components. As may be seen, a feature extraction method with spectral smoothing merely represents a preferred embodiment of the inventive method. Other modifications of the invention are also conceivable wherein the smoothing plays no part since, for example, the speech signal was edited in some other form or the calculating outlay for speech recognition plays a subordinate part.

An adaptive channel compression as in the RASTA method has the disadvantage that the filter H(z) has a slow transient response, as a result of which the stationary components of the spectra are only inadequately removed at the start of an expression and faulty recognition easily occurs there. In order to avoid this, the filter coefficients are set in a time-variable fashion in the invention, so that a fast transient response of the channel adaptation filter is achieved. The definition of the compensated spectra ensues according to the algorithm:

$$\hat{y}_i(n) = y'_i(n) - \bar{y}_i(n) \text{ with } i = 1, \ldots, K$$

$$\bar{y}_i(n) = \frac{1}{1 + a_{in}} (\bar{y}_{i0} a_{in} + \bar{y}(n))$$

with:

$$a_{in} = \frac{a_{i0}}{\hat{n}(n)} \quad \bar{y}_i(n) = (1 - \beta_n)\bar{y}_i(n-1) + \beta_{n'_i}(n) \quad \beta_n = \frac{\beta_o}{\hat{n}(n)},$$

wherein $\bar{y}_{i0}$, $\alpha_{i0}$, $\beta_0$ are constants that are acquired from statistical examinations of the speech signal; and $\hat{n}(n)$ is a function monotonously rising with n.

The constants $\bar{y}_{i0}$, $\alpha_{i0}$, $\beta_0$ are thereby determined, for example, by statistical examinations of typical speech material.

For example, random speech samples of typical speakers for the practical application of the invention are obtained in detail. These persons thereby preferably use application-associated transmission channels such as, for example, in ISDN connection, so that these random speech samples are affected by channel transmission properties typical for a respective speech transmission channel. The values of $\bar{y}_{i0}$ can then be defined as averages of the channel energies $\bar{y}'_i$. The values of $\alpha_{i0}$ are preferably approximated by the quotient $$\alpha_{i0} = \frac{\sigma_i^2}{\overline{\sigma_i^2}} \quad \text{with: } i = 1, \ldots, K$$

The variance of the averages $\bar{y}_{i0}$ is indicated by $\overline{\alpha}_i$, whereby the averages are preferably separately calculated for each random speech sample of a respective speaker. $\sigma_i$ is the variance of the channel values $\bar{y}'_i$. In case the averages $\bar{y}_{i0}$ of the random speech samples fluctuate only slightly, thus $\overline{\alpha}$ is to be selected small and $\alpha_{i0}$ is selected large. Beneficial values of $\alpha_{i0}$ for telephone applications lie on the order of magnitude from 10–15.

The value $\beta_0$ is preferably determined from the statistical dependency of chronologically neighboring channel energies $y'_i(n)$, $y'_i(n-1)$.

When the statistical dependency is slight, then $\beta_0=1$ is beneficially set. Smaller values of $\beta_0$ are prescribed with increasing statistical dependency, corresponding to the dependency.

The function $\bar{n}(n)$ is a function monotonously rising with n that is limited by a value Max to be empirically defined (see FIG. 4). Until the $\bar{n}$ quantity has reached the value Max, $\bar{n}$ can, for example, be selected proportional to n. The slope of the curve can be reduced in a signal section n when the signal section represents a pause in speaking. A value of 250 ms has proven beneficial for Max for telephone applications (see FIG. 4). During the pause in speaking, $\beta_n$ can also be set to an extremely small value or to 0.

The constants predetermined in the various processing stages of the feature extraction unit can be currently set by a controller Steu that receives information about the channel or about the type of disturbance from an external equipment. An example of such external information is as follows.

When a switching system is equipped with a speech recognition system, then the switching system can detect whether the caller is calling from an ISDN telephone system, from a mobile telephone or from an analog telephone. Dependent on the type of telephone, different coding and disturbing noises as well as different channel transmission characteristics are present, for which specific constants yield optimum recognition performance. These three (for example) different sets of constants are stored in the controller Steu and, after the connection is set up, are activated in the feature extraction unit of the speech recognition means dependent on the telephone type.

FIG. 4 shows the example of a time-weighting function with which the filter coefficients are acquired for the high-pass filter for determining the compensated spectral energies. It can be seen that the function Fu indicates a dependency on n and $\bar{n}$. A horizontal location Wa is characteristic of a pause in speaking. What this means is that the weighted time $\bar{n}$ does not increase in this region. The quantity $\bar{n}$ is limited to the value Max since the time window that is being observed would otherwise become too large in order to be able to follow a slow variation of the transmission channel.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for extracting features from a speech signal comprising the steps of:

determining spectral energies $(x_1, \ldots, x_N)$ of a speech signal by brief duration spectral analysis;

obtaining logarithmized spectral energies $(y_1, \ldots, y_n)$ from said spectral energies $(x_1, \ldots x_N)$; and $$\hat{y}_i(n) = y_i'(n) - \bar{y}_i'(n) \text{ with } i=1, \ldots, K$$

forming channel-compensated spectral energies $(\hat{y}_1, \ldots \hat{y}_N)$ from individual spectral energies $\bar{y}_i(n)$ using a high-pass filter with time-dependent filter coefficients, wherein $$\bar{y}_i'(n) = \frac{1}{1+a_{in}} (\bar{y}_{i0} a_{in} + \bar{y}_i(n))$$

$$a_{in} = \frac{a_{10}}{\hat{n}(n)} \quad \bar{y}_i(n) = (1 - \beta_n)\bar{y}_i(n-1) + \beta_{ni}'(n)\beta_n = \frac{\beta_o}{\hat{n}(n)} ,$$

wherein $\bar{y}_{i0}$, $\alpha_{i0}$ and $\beta_0$ and are constants that are acquired from statistical examinations of the speech signal, and $\hat{n}(n)$ is a function monotonously rising with n.

2. A method as claimed in claim 1 comprising the additional steps of:

superimposing spectral energies of at least one known noise signal on the speech signal and determining noise energies $(e_i)$; and conducting an irrelevancy reduction of the speech signal by comparing at least one spectral energy $(x_i)$ and a noise energy $(e_i)$ from the same frequency band end, if the noise energy $(e_i)$ is higher that the at least one spectral energy $(x_i)$, using the noise energy $(e_i)$ for further-processing of the speech signal instead of the spectral energy $(x_i)$.

3. A method as claimed in claim 2, wherein the known noise signal is the quantization noise of a speech coder.

4. A method as claimed in claim 2, comprising the additional step of using frequencies that are located outside of a range defined for the speech signal as said known noise signal.

5. A method as claimed in claim 2, comprising the additional step of noise signal of background noises during speaking as said known noise signal.

6. A method as claimed in claim 1 comprising the additional steps of:

calculating and storing parameters which are characteristic for at least two speech transmission channels on which the speech signal is transmitted;

assigning an unambiguous identifier to each of the speech transmission channels; and forming said channel-compensated spectral energies $(\hat{y}_1, \ldots \hat{y}_N)$ with the stored parameters dependent on the speech transmission channel on which said speech signal is transmitted.

7. A method as claimed in claim 6, wherein the step of calculating and storing said parameters comprises calculating and storing parameters for ISDN speech transmission.

8. A method as claimed in claim 6, wherein the step of calculating and storing said parameters comprises calculating and storing parameters for mobile radio telephone speech transmission.

9. A method as claimed in claim 6, wherein the step of calculating and storing said parameters comprises calculating and storing parameters for analog telephone speech transmission.

* * * * *